(12) United States Patent
Rushing et al.

(10) Patent No.: US 6,356,360 B1
(45) Date of Patent: Mar. 12, 2002

(54) APPARATUS AND METHOD FOR RENDERING HALFTONE DOT STRUCTURES USING GREY LEVEL DOTS

(75) Inventors: Allen J. Rushing, Webster; Dongli Yang, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/990,701

(22) Filed: Dec. 16, 1997

(51) Int. Cl.[7] .................... G06K 15/02; H04N 1/405; H04N 1/407
(52) U.S. Cl. .................. 358/1.9; 358/457; 358/458
(58) Field of Search ..................... 358/298, 430, 358/296, 300, 302, 355, 534, 518, 456, 459, 457, 458, 460, 466, 462, 1.9; 346/160; 382/137, 270

(56) References Cited

U.S. PATENT DOCUMENTS

| 4,701,811 | A |   | 10/1987 | Moriguchi et al. |
| 4,868,587 | A |   | 9/1989 | Loce et al. |
| 4,910,603 | A | * | 3/1990 | Hirahara et al. ............ 358/298 |
| 5,196,942 | A | * | 3/1993 | Shiau ........................ 358/298 |
| 5,198,910 | A |   | 3/1993 | Ng et al. |
| 5,200,831 | A | * | 4/1993 | Tai ............................ 358/298 |
| 5,253,934 | A |   | 10/1993 | Potucek et al. |
| 5,351,138 | A | * | 9/1994 | Sasaki ....................... 358/462 |
| 5,365,348 | A |   | 11/1994 | Drees et al. |
| 5,406,379 | A |   | 4/1995 | Kingsley et al. |
| 5,666,150 | A |   | 9/1997 | Ajewole |

OTHER PUBLICATIONS

P. Pirsch and A. N. Netravali, Transmission of Gray Level Images by Multilevel Dither Techniques Nov. 24, 1983, Pergamon Press Ltd, pp. 31 through 44.*

* cited by examiner

Primary Examiner—Scott Rogers
(74) Attorney, Agent, or Firm—Norman Rushefsky (57) ABSTRACT

A method and apparatus of generating rendered image data for use in reproducing an image with a series of patterns of halftone dots. In the method and apparatus an unrendered pixel value of a pixel to be rendered is compared with each of a series of threshold values in accordance with respective comparison criteria and a grey level for a rendered pixel of a halftone dot is generated by having certain threshold values define increasing grey level values of the rendered pixel upon meeting respective criteria and at least one threshold value of the series defines a decrease in grey level value of the rendered pixel for meeting a respective comparison criteria.

21 Claims, 5 Drawing Sheets

FIG. 3a INCREASING MASKS
THRESHOLDS INDEX L=1 (DARKNESS=1)

| 70 | 193 | 131 | 101 |
|---|---|---|---|
| 162 | 8 | 16 | 224 |
| 131 | 101 | 70 | 193 |
| 16 | 224 | 162 | 8 |

FIG. 3b DECREASING MASKS (TO NEXT LOWER INDEX LEVEL) — P2

| x | x | x | x |
|---|---|---|---|
| x | 23 | x | x |
| x | x | x | x |
| 23 | x | x | x |

FIG. 3c INCREASING MASKS — P2

| x | x | x | x |
|---|---|---|---|
| x | 31 | x | x |
| x | x | x | x |
| 31 | x | x | x |

FIG. 3d — P2
THRESHOLDS INDEX L=2 (DARKNESS=3)

| 77 | 201 | 139 | 108 |
|---|---|---|---|
| 170 | 23 | 46 | 232 |
| 139 | 108 | 77 | 201 |
| 46 | 232 | 170 | 23 |

FIG. 3e — P2
THRESHOLD INDEX L=3 (DARKNESS=4)

| 93 | 216 | 155 | 124 |
|---|---|---|---|
| 186 | 39 | 62 | 247 |
| 155 | 124 | 93 | 216 |
| 62 | 247 | 186 | 39 |

FIG. 3f — P2

| 108 | 232 | 170 | 139 |
|---|---|---|---|
| 201 | 46 | 77 | x |
| 170 | 139 | 108 | 232 |
| 77 | x | 201 | 46 |

FIG. 3g — P2

| 116 | 240 | 178 | 147 |
|---|---|---|---|
| 209 | 54 | 85 | x |
| 178 | 147 | 116 | 240 |
| 85 | x | 209 | 54 |

APPARATUS AND METHOD FOR RENDERING HALFTONE DOT STRUCTURES USING GREY LEVEL DOTS

BACKGROUND OF THE INVENTION

1. Field of the Invention

This invention is directed to apparatus and methods of processing image information for rendering images using halftone dot structures.

2. Brief Description of the Prior Art

In the prior art the rendering of pictorial images by printers or displays is conventionally made by building dots within halftone cells so that grey levels of an image result from halftone dots of different grey levels. Assuming, as an example, that eight pixels comprise each halftone cell it is possible to have halftone dots that vary in density from 0 to 8 in the case where binary pixels only are rendered; i.e., either a pixel is placed at a pixel location or it is not. Thus, only 9 levels of density can be represented by such a halftone cell. In an attempt to raise the number of grey levels of a halftone cell, one may increase the number of pixels encompassed by the cell, however, this has an adverse impact on image resolution.

In U.S. Pat. No. 5,198,910 to Ng et al, additional numbers of grey levels or ranges covered by grey level halftone cells is taught to be achievable by switching between different dot type growth patterns. For example, for lower densities a Bayer or dispersed type growth pattern is used wherein density of a halftone cell is increased by adding pixels at spaced locations from other pixels in the cell. Such a dot growth pattern is favored for low density regions. For higher density regions, a cluster type of growth pattern is more favored wherein growth of grey levels of the halftone cell is made by adding pixels around a central pixel of the halftone cell. A disadvantage with this approach, as well as the binary pixel halftone cell approach, is that it, too, does not provide a sufficient number of grey levels to halftone cells for providing for better quality of halftone reproductions of images. In U.S. Pat. No. 5,200,831 to H. T. Tai, there is disclosed the rendering of grey level patterns using halftone cells that are each comprised of plural grey level pixels. For example, in a two-bits per pixel system a grey level pixel may be of relative absorptance or relative spot size 0, 1, 2, or 3. With eight pixels to a halftone cell, it is possible for the cells to be of any density 0–24 and thus 25 cell density levels are realizable. While this is significantly better than the binary approach, there is a need for still higher numbers of halftone images.

In U.S. Pat. No. 4,868,587 to Loce et al and U.S. Pat. No. 5,406,379 to Kingsley et al, there is recognized that when more halftone levels are needed than can be obtained conventionally, one can introduce the concept of halftone cell density growth through the introduction of non-monotonicity in pixel growth, along with unequally spaced pixel absorptance levels. As will be described more fully below, this type of growth has corresponding pixels in halftone cells of progressively higher density halftone dots change direction in pixel growth. However, the approaches described by Loce et al and Kingsley et al require that a halftone cell can be generated by first calculating a block average, for example a 2×4 block of pixels to be rendered, and then rendering the halftone cell of pixels from the average of the block. A problem with this approach is that edges passing through the block are rendered poorly since the edge information is averaged into the block. These patents recognize this problem that averaging would lose microstructure detail and suggest a need to rearrange the pixels within a halftone cell to better match the original detail. However, little guidance is offered to accomplish this result.

In multi-bit halftoning, as taught for example in the aforementioned patent to Tai, U.S. Pat. No. 5,200,831, a single threshold mask for each level efficiently renders the input image into a halftone pattern. The successive halftone patterns are correlated with the preceding pattern in the sense that pixel density for only one or a few pixels is increased from one pattern to the next, the other pixels remaining unchanged. Thus, there is no need to store in memory the complete pattern details for all the halftone levels. The masks specify the thresholds at which each pixel is to be increased to the next grey level. Image detail within the cell is largely preserved, while imposing a regular halftone dot pitch. However, the conventional threshold masks cannot deal with pixels that increase non-monotonically in density as the halftone dot is built.

For the special case of a single intermediate grey level, i.e., "ternary" halftoning, Moriguchi et al, U.S. Pat. No. 4,701,811 describes an implementation involving fully black "full" dots and "half" dots (actually 70% of the "full" dot area). Thresholding is applied pixel-by-pixel without averaging, to both increase and decrease the pixel coverage. Halftone levels well beyond the number obtained conventionally are achieved, but no particular attention is paid to correlated dot building, so that the threshold switches are more numerous than necessary, which adds complexity and detracts from the halftone pattern continuity as the halftone dot is built. The connection between number of pixels per cell and optimal values for pixel grey levels is not recognized. In the particular halftone patterns shown, no attention is paid to dot stability and low granularity (see Tai, U.S. Pat. No. 5,200,831 for discussion of these issues), nor to maintaining a regular dot pitch. Furthermore, if one contemplates extending the concepts of this patent to cases of 2 or more intermediate grey levels, it is not obvious how to space the pixel grey levels for the most halftone levels.

It is, therefore, an object of the invention to provide an improved method and apparatus for generating halftone images by increasing the number of available densities to halftone dots.

SUMMARY OF THE INVENTION

In accordance with a first aspect of the invention, there is provided a method of reproducing an image with a series of patterns of halftone dots, each halftone dot being comprised of plural pixels arranged in a halftone cell, the image being derived from unrendered image data represented by pixels each having an unrendered pixel value density assignment of one of M grey levels, the method comprising generating rendered pixels by comparing for each of at least some pixels to be rendered a corresponding unrendered pixel value with threshold values associated with the corresponding position of the pixel to be rendered in a halftone cell, the rendered pixels being generated with at least R+1 levels of density including background, wherein R is a whole number greater than two and less than M; and forming halftone dots each of plural rendered pixels wherein at least some halftone dots are of a first density D1 and other halftone dots are of a second density D2 and wherein D2>D1, a halftone dot of density D1 having a rendered pixel at a respective pixel location with an assigned density d1 and a halftone dot of density D2 having a rendered pixel at the same respective pixel location with an assigned density d2 and wherein d2<d1.

In accordance with a second aspect of the invention, there is provided a method of generating rendered image data for use in reproducing an image with a series of patterns of halftone dots, each halftone dot being comprised of plural pixels arranged in a halftone cell, the image being derived from unrendered image data represented by pixels each having an unrendered pixel value density assignment, the method comprising comparing an unrendered pixel value of a pixel to be rendered with each of a series of threshold values in accordance with respective comparison criteria; and generating a grey level for a rendered pixel of a halftone dot by having certain threshold values define increasing grey level values of the rendered pixel upon meeting respective comparison criteria and at least one threshold value of the series defining a decrease in grey level value of the rendered pixel for meeting a respective comparison criterion.

In accordance with a third aspect of the invention, there is provided an apparatus for generating rendered image data for use in reproducing an image with a series of patterns of halftone dots, each halftone dot being comprised of plural pixels arranged in a halftone cell, the image being derived from unrendered image data represented by pixels each having an unrendered pixel value density assignment, the apparatus comprising means for comparing an unrendered pixel value of a pixel to be rendered with each of a series of threshold values in accordance with respective comparison criteria and means for generating a grey level for a rendered pixel of a halftone dot by having certain threshold values define increasing grey level values of the rendered pixel upon meeting respective comparison criteria and at least one threshold value of the series defining a decrease in grey level value of the rendered pixel for meeting a respective comparison criterion.

The invention will become more apparent from the following detailed description and the appended claims when read in conjunction with the accompanying drawings.

DETAILED DESCRIPTION OF THE PREFERRED EMBODIMENTS

Because apparatus of the type described herein are well known, the present description will be directed in particular to elements forming part of, or cooperating more directly with, the present invention.

Figure 1:
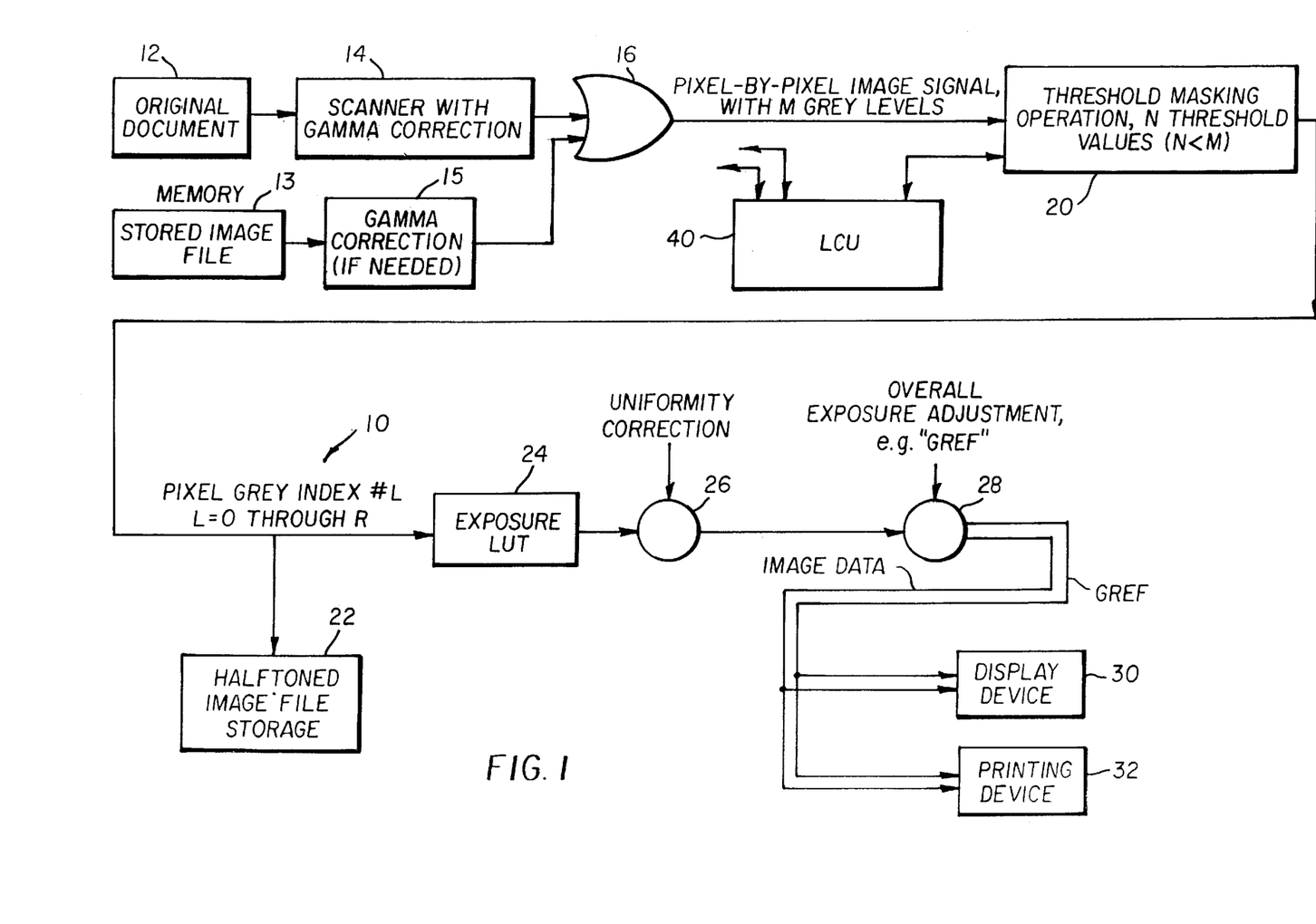
FIG. 1 is a block diagram schematic of an apparatus for reproducing image data in accordance with the method and apparatus of the invention.

With reference to FIG. 1, the image reproduction apparatus 10 is adapted to have image information input therein in the form of an original document 12 or stored image data file 13. The image information on the document may be a continuous photograph a halftone original or text or combinations thereof. The data on the document is scanned by a scanner 14 to generate, for example, an 8 bits per pixel digital representation of the data. Typically known scanners have scanning resolutions of 600×600 dots or pixels per inch (dpi) or greater and may scan the document for color information in each of two or three color separation records. Although the invention may be used with color scanners the description herein will illustrate the processing of image data with reference to scanning in terms of a grey level representation of an image, it being understood that one of ordinary skill in the art may use the teachings herein for reproducing or processing images in color. The term "grey level" as used herein thus also implies changes in density in color pixels or halftone dots. Likewise the term "absorptance" as used herein applies to black and white as well as color devices, it being understood that for color "absorptance" refers to that portion of the light spectrum absorbed by the colorant used in the printing or display device. The scanner 14 is provided with circuitry for correcting scanned data for various nonuniformities in scanning and for correcting for gamma correction as is well known. The 8 bits per pixel image data signal output by the scanner (or from the stored data file of images 13 after gamma correction by processor 15) is input into a gate control 16 illustrated as a logic OR gate but more typically is a gate that is under electronic control of a logic and control unit (LCU) 40. The LCU 40 includes one or more computers for controlling timing and operation of the various functions to be performed by the image processing apparatus 10. The LCU operates under programmed control in accordance with available hardware. The logic and control means of the type refined to herein are well known and widely available.

The eight bits per pixel image data represents M grey level values of the pixel from 0 to 255 (highest density). In order to be printed or displayed, (both generally being a form of "reproduction" as the term is used herein), by the output portion of the apparatus 10, the pixels are required to be each rendered so that each pixel is represented by a bit depth compatible with that of the printer 32 or display device 30. In this example assumption will be made that the display device 30 or printing device 32 is capable of processing image data at only 2 bits per pixel to represent rendered grey level. A further assumption is made that the pixel resolution of the image data output from OR gate 16 is the same resolution as that of the printing device 32 and display device 30. If it is not the same resolution it is well known to take a raw data input from a scanner or other image input device and process that data to a resolution compatible with that of the output device.

Each input pixel is rendered to a two bits per pixel bit depth by the threshold masking operation of block 20. The threshold masking operation block has stored therein only N unique threshold values that are selectively used depending upon location of a pixel for rendering any raw (unrendered) image data pixel value from 0 through 255 into a grey level that can be defined by two bits per pixel of image data. In the example provided below N may be 32 but is always less than M. As inputs to the operation block 20 there will be provided in addition to the raw pixel value, an indicator of location of the pixel so as to define which threshold values are to be used for rendering this pixel. The location data is provided by conventional counters that are software or hardware generated and are well known in the art of rendering raw pixel data into halftones. After a signal is output from block 20 which defines a two bit pixel value representing a level L=0 through R wherein for the two bit case R=3. This signal may be stored in a halftoned image file storage 22 for later processing or processed by applying the two bits per pixel signal representing L as an input to an exposure look-up-table LUT 24. The exposure LUT 24 converts the rendered pixel value into a an uncorrected exposure value. This value can further be modified by a processor 26 by providing for uniformity correction for the display elements of the display device 30 or the printing elements of the printing device 32. The printing device 32 is preferably an LED printhead array that comprises about 5000 or more LEDs arranged in a row at intervals of 1/600 inches. The printhead will be arranged and supported at a location so that a recording medium such as a uniformly charged electrophotoconductive web or drum upon which an electrostatic image is to be recorded is moved relative to the printhead with the rows of LEDs positioned in a direction cross-track to that of movement of the recording medium. The recording medium may also be a photographic film. The LEDs are known to have light emitters that are not uniform over the length of the printhead. It is known, therefore, to provide correction for these nonuniformities using additional bits of data. Examples of printheads having such correction are provided in U.S. Pat. No. 5,666,150 (Ajewole). In addition to correction for nonuniformity using signals representing data bits sent to the printhead or display device, further correction may be provided by a processing block 28 using current control to control driver chip non-uniformity and exposure adjustments that are needed for process control, examples of which are provided in U.S. Pat. No. 5,253,934. If desired, the exposure LUT 24 and processing block 26 may be combined as one LUT. Other printers may use laser exposure or other spatial light modulators. The invention is also applicable to electrographic recording, ink-jet or thermal recording.

Figure 4:
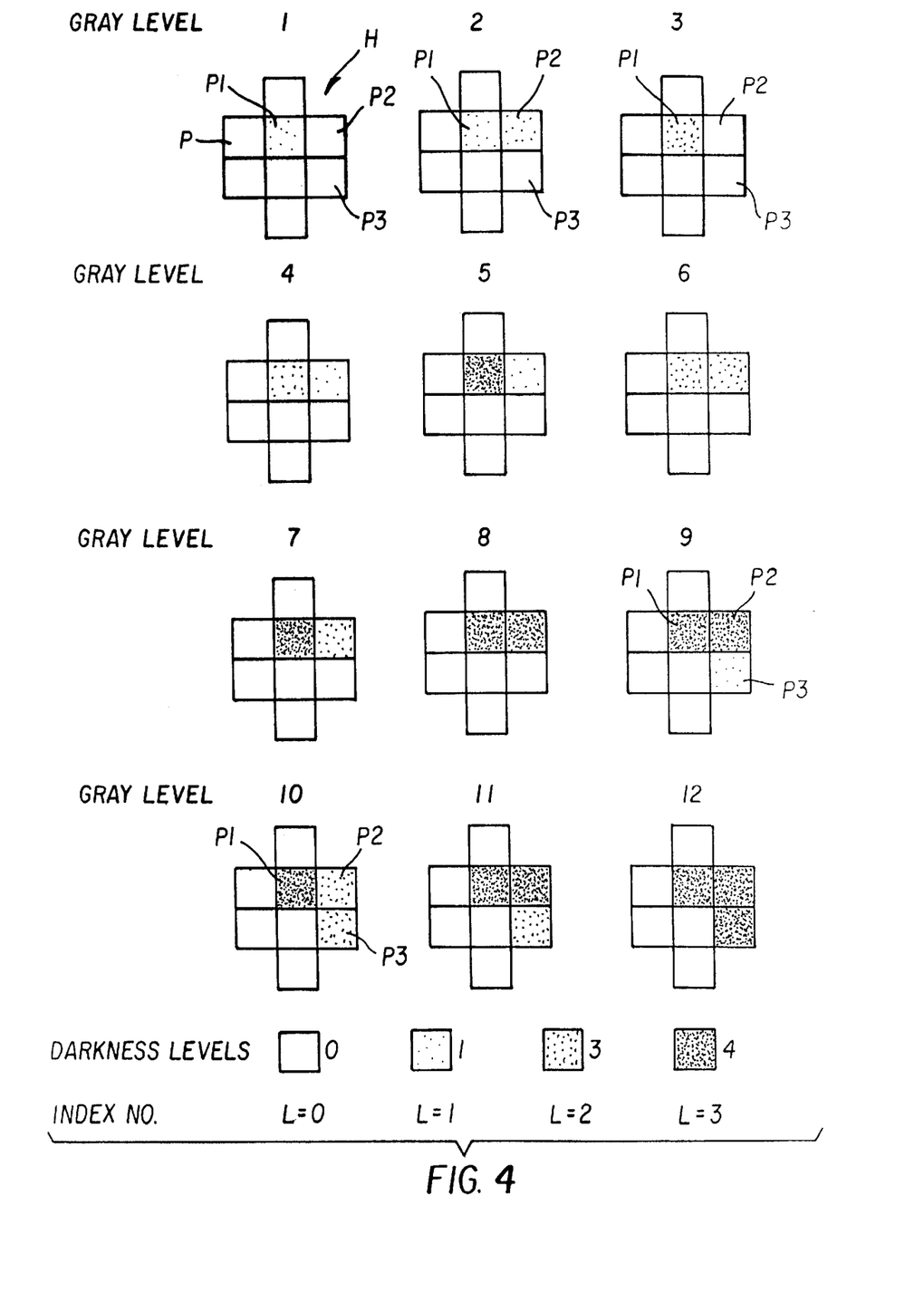
FIG. 4 is an illustration of a halftone dot structure showing the technique for growth of density in the halftone cell.

With reference now to FIG. 4 there is shown a halftone dot density growth pattern for halftone cells provided according to the inventions. As noted above where the bit depth, i.e. number of bits used to define the grey level of a pixel, is relatively low there is limited ability to define better quality pictorial information. The use of the halftone cell dot structure improves the ability to represent variations in grey level but to obtain further increases in grey level typically this will require lower resolution as cell dot size increases.

In the example of FIG. 4 a typical "bow-tie" type of halftone cell structure is illustrated. Of course other halftone cell configurations may be used. Grey level or darkness values of the halftone cell dot structure are shown for grey levels 1–12. Here we use the term "darkness" to mean absorptance, relative to background, of the illuminating light in the case of a reflectance print or reflective display or transmissive display. The overall relative darkness of the halftone cell is then given by the sum of the darkness values of the individual pixels, as in FIG. 4, for example. In the case of a self-luminous display device, darkness would be a non-linear function of brightness for such device, also the overall relative darkness of the halftone cell is given by the sum of the pixel darkness values. Using the algorithms to be described below for dot growth it is possible to provide halftone dots with grey level density from 0 (all pixels in the cell are 0) to 32 (all the pixels in the halftone cell are at maximum relative darkness level 4). A total of 33 halftone dot grey levels or darkness levels (including "0" or background) may be realized in this example. A preferred feature of this dot growth pattern is to have the index or the respective rendered grey level pixel bit representations L=2 and L=3 represented by relative darkness levels 3 and 4 respectively to provide unequally spaced pixel absorptance levels. Thus, the darkness level 3 is three times that of darkness level 1 not double as might be expected from the respective pixel bit representation and the darkness level 4 is four times that of darkness level 1 and not three times as might be expected from the respective bit representation. As noted above each halftone cell dot H is formed of eight pixel locations P. Each pixel location P is represented after rendering by a two bit value that identifies a number corresponding to grey level or darkness of the pixel. Since in this case there is not an identical correspondence between pixel bit value (L value) and darkness, the pixel bit values will be referred to as index numbers. The index numbers or L values, since they have a two bits per pixel representation, have index values L=decimal 0, 1, 2, and 3. As shown in FIG. 4, these index values correspond with darkness levels 0, 1, 3, and 4 respectively. In FIG. 4 a halftone cell dot grey level of one is formed by one pixel of darkness level 1 in the halftone cell at the location P1 indicated near the center of the cell. A halftone cell dot of grey level two is created by providing the cell with two adjacent pixels of darkness level 1 each at pixel locations P1 and P2 shown. A halftone cell dot of grey level three is created by forming a single pixel at the near center location. Note that this approach departs from typical growth patterns which tend to provide for monotomic growth; i.e. change of growth in pixel density is in one direction only when halftone cell density increases. Pixel location P2 has not exhibited monotomic change since its growth has gone from 0→1→0. Pixel locations P1 and P2 feature monotonic growth in halftone cell dot grey levels 4 through 9. However, in creating halftone cell dot grey level 10, pixel location P2 is reduced from darkness level 4 in halftone cell dot grey level 9 to darkness level 3 in halftone cell dot grey level 10. Pixel location P2 thus has again not exhibited monotonic growth in this transition. However, by not providing for monotonic growth of pixel location P2 various advantages result. Halftone cell grey level 10 is obtained using just three pixels rather than resorting to the use of four pixels of darkness levels 4, 4, 1, 1. The advantage of using just three pixels is that in certain reproduction processes such as electrophotography low levels of density tend to create unstable pixel locations whereas more stability and hence more accurate rendition is possible by greater densities relative to background.

Figure 2:
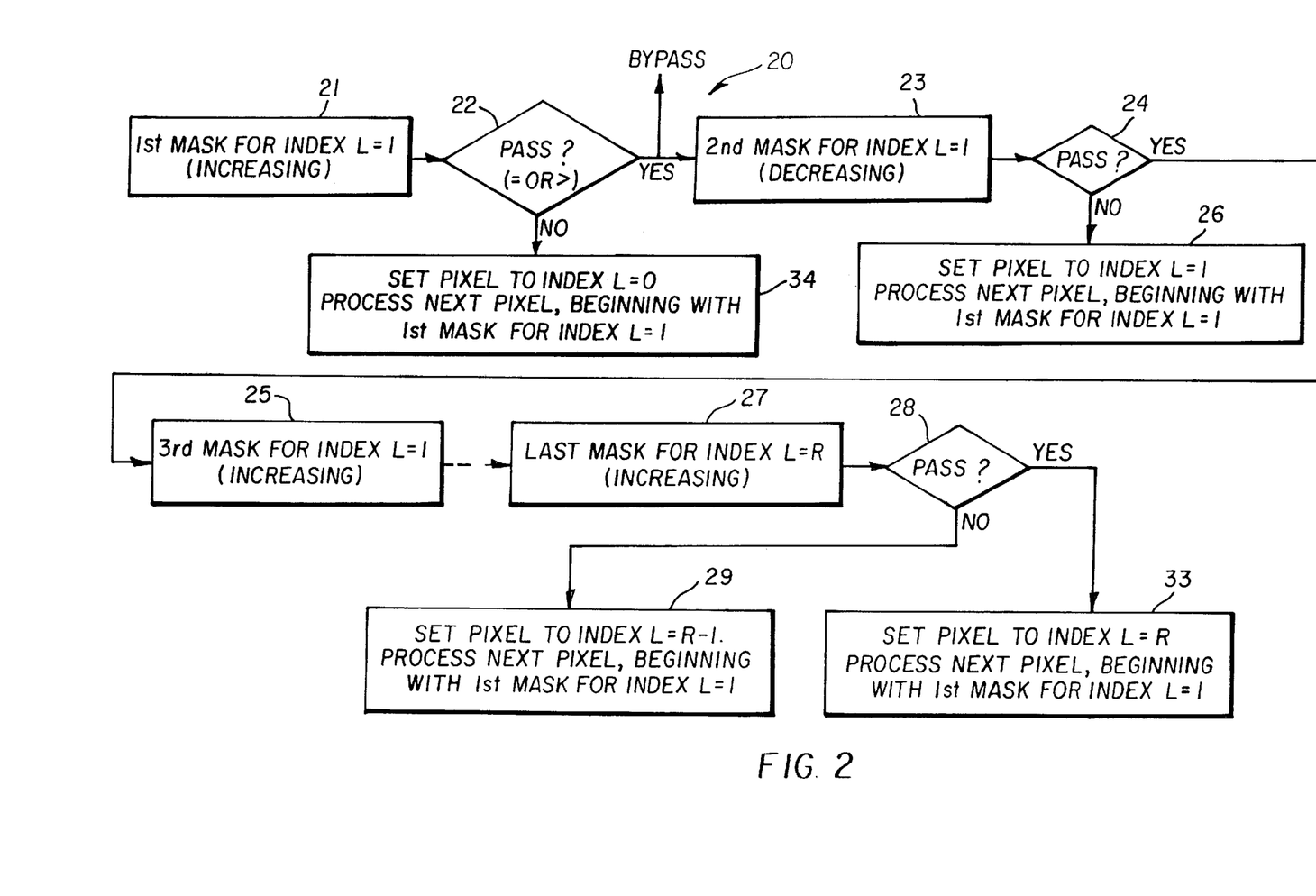
FIG. 2 is a flow chart of a threshold masking operation forming a portion of an image processing operation in the apparatus of FIG. 1.
Figure 3A:
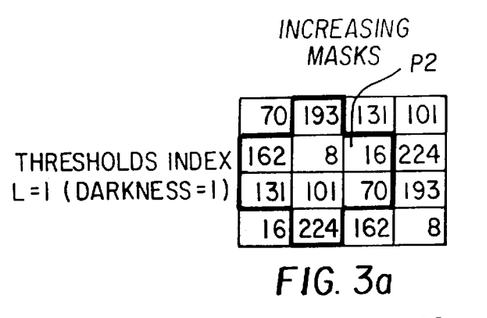
FIGS. 3a–3g are examples of threshold masks set for rendering image data in accordance with the threshold masking operation of FIG. 2.
Figure 3B:
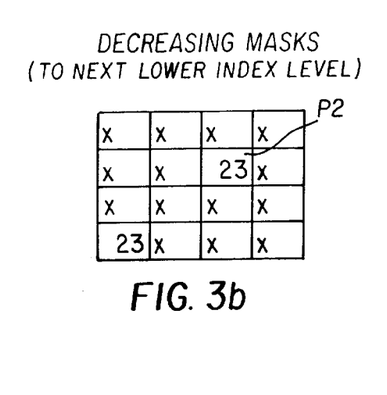
Figure 3C:
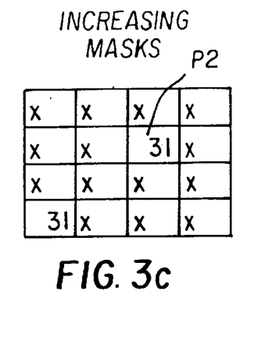
Figure 3D:
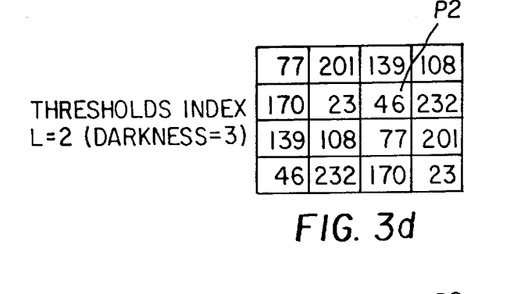
Figure 3E:
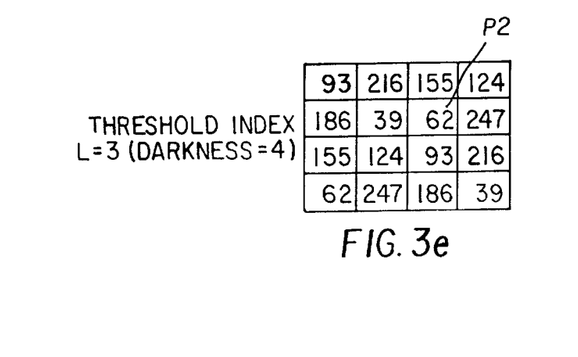
Figure 3F:
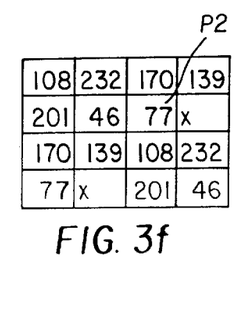
Figure 3G:
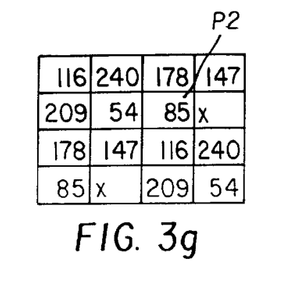

With reference now to FIGS. 2 and 3 there is provided a flow chart representing operation of the thresholding masking operation block 20 for rendering pixels for building halftone dots so that certain pixels do not continuously grow monotonically. In the flow chart of FIG. 2, a raw pixel value having a defined location may be processed with each of several threshold masks. Some of these masks are defined as increasing masks, (left and right columns in FIG. 3) and others (middle column FIG. 3) are defined as decreasing masks. The raw pixel value is processed in turn with one value from each mask until it fails to pass that mask. The operation is best understood by considering specific examples. Considering FIG. 3 it may be seen that the threshold masks are each merely a block of preassigned threshold numbers. A pixel location will merely define pixel location relative to a corresponding location in the threshold mask block. Any pixel on the page of a document or image can be assigned a corresponding location corresponding to a threshold value from the block as indicated for that of P2 in FIG. 3.

As noted above, the raw image data values from the scanner or stored image file, after correction, provides an input to block 20 of a grey level signal value representing a number from decimal 0 through 255 that corresponds to the density of the scanned pixel. Consider the case of a pixel that is assigned a position corresponding to P2 in the halftone cell. Assume further that this pixel has a raw or unreduced grey level value of decimal 78. In step 21 the value 78 is compared with the level L=1 threshold mask value (mask (a) of FIG. 3) at the location corresponding to pixel P2 which threshold value is 16. In step 22 the raw grey level value of the pixel is compared with the threshold value corresponding to its position in the threshold mask according to a predetermined comparison test or criterion which in this case is greater than or equal. Other comparative tests may also be used. Since 78 is larger than 16 the pixel passes test step 22 and is preliminarily assigned an index value L=1. Any raw pixel value not passing the threshold test at L=1 is assigned an index value L=0 and the next pixel is then processed starting with the first mask (a). The raw pixel value having passed step 22 is compared with a corresponding threshold value in step 23 with that in mask (b) of FIG. 3. This value is 23 and the raw value 78 passes this test, step 24. In passing this step the preliminary assigned index value of the pixel L=1 is reduced by one to L=0 since the raw pixel value that passes this mask has its index level reduced in value and thus the designation of this mask as a "decreasing mask". If a raw pixel value does not pass this test the pixel index value is set to L=1 and the next raw pixel value is processed beginning with the first mask. Since the raw pixel value has passed the step 24 it is then compared with the corresponding threshold value in the third mask, step 25. The threshold value in this third mask is 31 and the raw pixel value passes this test too. In passing this step the index value L=0 is now raised by one to L=1 since raw pixel values that pass this test for mask (c) are increased and hence this is an increasing mask. The raw pixel value can be seen to pass mask (d), mask (e), mask (f) but not the last mask (g) which is step 27. In passing masks (d), (e), and (f) the index value is changed respectively from its last value of L=1 to L=2, L=3, L=2 respectively. Since it did not pass step 28 the pixels index value is assigned or rendered to be L=2 and the raw pixel value for the next pixel is processed beginning with step 21. If the raw pixel value at pixel location P2 had been 85 or greater it would have passed step 28 and its index value would have been set to L=3.

It will be noted that in masks (b), (c), (f) and (g) there are pixel locations indicated by an "x" which denotes a bypass to the next index level mask, if there is a next level, or that the raw pixel value is considered to have passed the test for that mask and its index level is not changed. The selective mask bypassing, as described above, speeds up the numerical processing but is not essential.

The threshold pattern numbers in each mask are properly assigned to give the growth pattern indicated by FIG. 4. This can easily be determined by considering a uniform field of raw pixel input values and operating on this field in accordance with the above description. It can be easily seen that a raw input values of all pixels in a field being input grey level 8 will be rendered at the display or printer by a series of halftone dots of grey level 1. Similarly a raw input of pixels values all of which are input grey level 16 will be rendered with a series of halftone dots of grey level 2. A raw input of pixel values all of which are 70 will produce a series of halftone cells wherein pixel locations P1, P2 and P3 are reproduced with rendered pixel index values 3, 3 and 1 respectively or as density values 4, 4 and 1 respectively to provide a halftone cell grey level value of 9. However, when the raw input pixel values are all 77, pixel locations P1, P2 and P3 are rendered as index values 3, 2, and 2 respectively or as density values 4, 3, and 3 respectively to provide a halftone cell grey value of 10. Of course in practice the raw input pixel values will vary in gradation according to the image so that rendered halftone dots of all densities will vary accordingly. The 256 (including background) original or raw brightness levels thus can be rendered by 33 halftone grey level steps including 0.

Figure 5:
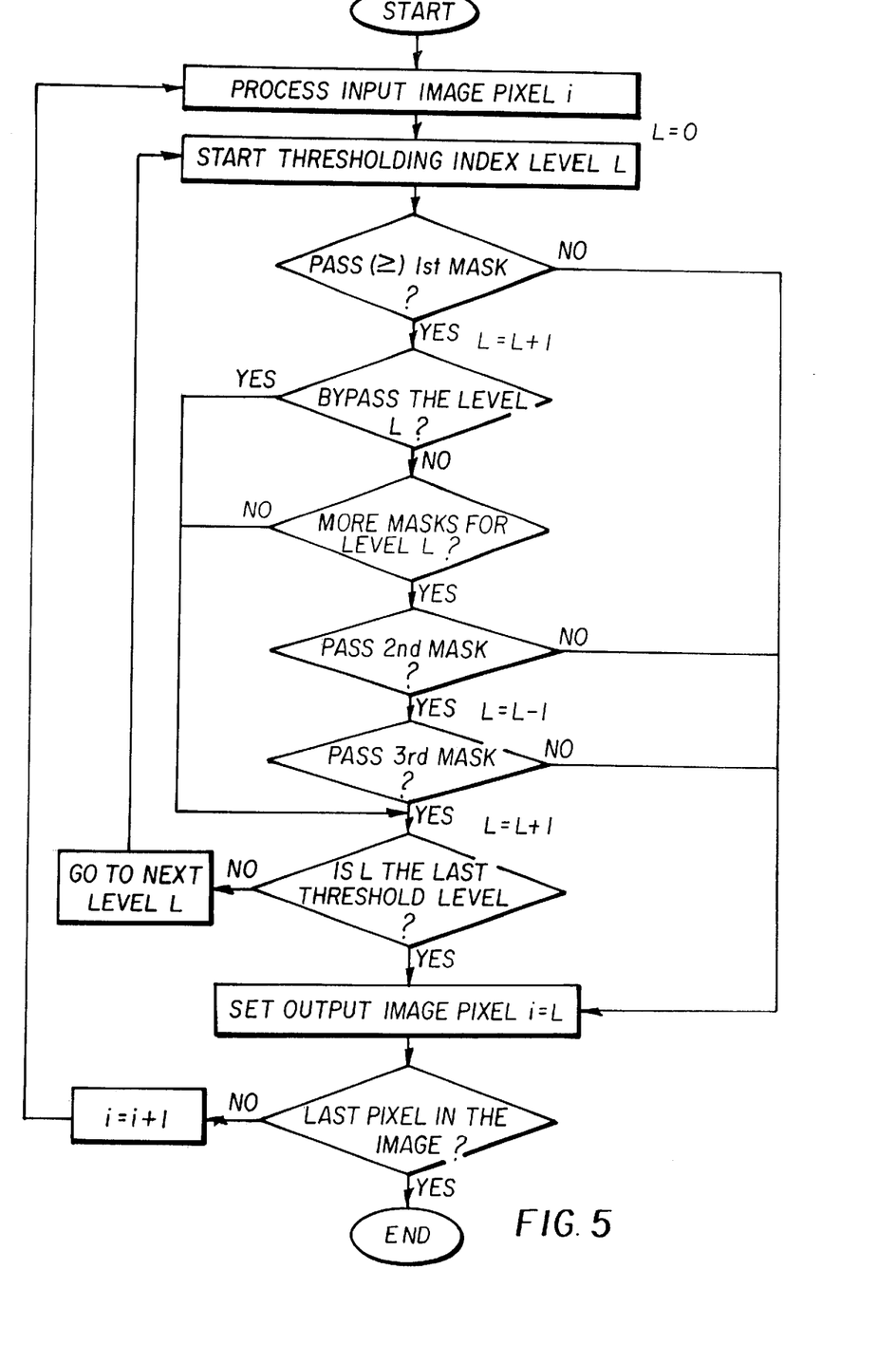
FIG. 5 is a flow chart of the threshold masking operation of FIG. 2 and illustrating a flow chart as it might be implemented in a computer program.

The flow chart of FIG. 5 is a more detailed version of that of FIG. 2 and useful as a type of program suited for operation by a computer. This above description is consistent with this flow chart and explanatory thereof.

The above description has shown that by use of increasing and decreasing masks that a simple and efficient process for implementation of pixel rendering can be accomplished in a scheme where density growth patterns on a pixel basis are nonmonotonic for certain pixels. There is no need for averaging pixels over a cell to thereby lose definition of the image as taught by the prior art. It will be understood, of course, that the invention may be extended to feature additional increasing and decreasing masks. Thus, for example between index levels 1 and 2, there could be two increasing and two decreasing masks instead of one of each in the illustrated example Additionally, in the 2-bits per pixel case relative darkness levels 0, 1, 2 and 4 could be provided instead of 0, 1, 3 and 4 in the illustrated example.

The invention may be implemented using computers or dedicated circuits the design of which is well within the skill of the art. The nature of the printer or display is not critical to this invention as long as the pixel representation is grey level; i.e. not binary and thus it takes at least two bits to define the grey level representation of the pixel. The description of halftone dots in a printed record is descriptive, in the case of electrophotography, of dots formed by recorded pixels on a photoconductor or primary image recording member since upon transfer and fusing to a receiver sheet the fusing is likely to cause smearing of the dots.

The invention has been described in detail with particular reference to certain preferred embodiments thereof, but it will be understood that variations and modifications can be effected within the spirit and scope of the invention.

What is claimed is:

1. A method of reproducing an image with a series of patterns of halftone dots, each halftone dot being comprised of plural pixels arranged in a halftone cell, the image being derived from unrendered image data represented by pixels each having an unrendered pixel value density assignment of one of M grey levels, the method comprising:

generating rendered pixels by comparing for each of at least some pixels to be rendered a corresponding unrendered pixel value with threshold values associated with the corresponding position of the pixel to be rendered in a halftone cell, the rendered pixels being generated with at least R+1 levels of density including background, wherein R is a whole number greater than two and less than M; and forming halftone dots each of plural rendered pixels wherein at least some halftone dots are of a first density D1 and other halftone dots are of a second density D2 and wherein D2>D1, a halftone dot of density D1 having a rendered pixel at a respective pixel location with an assigned density d1 and a halftone dot of density D2 having a rendered pixel at the same respective pixel location with an assigned density d2 and wherein d2<d1, and wherein d2 is assigned a background density.

2. The method according to claim 1 wherein d1 is assigned a value of one density level above background density.

3. The method according to claim 1 and including forming other halftone dots each of plural rendered pixels wherein at least some halftone dots are of a first density D3 and other halftone dots are of a second density D4 and wherein D4>D3, a halftone dot of density D3 having a rendered pixel at a respective pixel location with an assigned density d3 and a halftone dot of density D4 having a rendered pixel at the same respective pixel location with an assigned density d4 and wherein d4<d3, and wherein d4 and d3 are each assigned a density greater than background.

4. A method of reproducing an image with a series of patterns of halftone dots, each halftone dot being comprised of plural pixels arranged in a halftone cell, the image being derived from unrendered image data represented by pixels each having an unrendered pixel value density assignment of one of M grey levels, the method comprising:

generating rendered pixels by comparing for each of at least some pixels to be rendered a corresponding unrendered pixel value with threshold values associated with the corresponding position of the pixel to be rendered in a halftone cell, the rendered pixels being generated with at least R+1 levels of density including background, wherein R is a whole number greater than two and less than M; and forming halftone dots each of plural rendered pixels wherein at least some halftone dots are of a first density D1 and other halftone dots are of a second density D2 and wherein D2>D1, a halftone dot of density D1 having a rendered pixel at a respective pixel location with an assigned density d1 and a halftone dot density D2 having a rendered pixel at the same respective pixel location with an assigned density d2 and wherein d2<d1, and wherein R=3 and the rendered pixels are generated at levels L=0, 1, 2, 3 levels of density, where L=0 corresponds to background, wherein the absorptance relative to background of a printed or displayed pixel that is a pixel rendered at L=2 is more than two times the absorptance relative to background of a printed or displayed pixel that is a pixel rendered at L=1.

5. The method according to claim 4 wherein pixel values of some pixels to be rendered are compared with threshold values that result in the pixels being rendered at gradation levels less than determined by prior threshold comparison determinations.

6. The method according to claim 4 wherein halftone dots of increasing density include respective rendered pixels at corresponding respective pixel locations that are characterized by a nonmonotonic growth pattern.

7. The method according to claim 6 and including the step of displaying the rendered image data as a halftone image.

8. The method according to claim 6 and including the step of printing the rendered image data.

9. The method according to claim 1 wherein R=3 and the rendered pixels are generated at levels L=0, 1, 2, 3 levels of density wherein the absorptance relative to background of a printed or displayed pixel that is a pixel rendered at L=2 is more than two-thirds the absorptance relative to background of a printed or displayed pixel rendered at L=3.

10. The method according to claim 1 wherein R=3 and the rendered pixels are generated at levels L=0, 1, 2, 3 levels of density wherein the absorptance relative to background of a printed or displayed pixel that is a pixel rendered at L=2 is less than two-thirds the absorptance relative to background of a printed or displayed pixel rendered at L=3.

11. The method according to claim 1 wherein R=3 and the absorptance relative to background of a printed or displayed pixel that is a pixel rendered at L=3 is more than three times the absorptance relative to background of a printed or displayed pixel rendered at L=1.

12. The method according to claim 1 wherein a difference in absorptance between first and second pixels of first and second respectively adjacent levels of density is different than a difference in absorptance between the second pixel and a third pixel of second and third respectively adjacent levels of density.

13. A method of generating rendered image data for use in reproducing an image with a series of patterns of halftone dots, each halftone dot being comprised of plural pixels arranged in a halftone cell, the image being derived from unrendered image data represented by pixels each having an unrendered pixel value density assignment, the method comprising:

comparing an unrendered pixel value of a pixel to be rendered with each of a series of threshold values in accordance with respective comparison criteria; and generating a grey value for a rendered pixel of a halftone dot by having certain threshold values define increasing grey level values of the rendered pixel upon meeting respective comparison criteria and at least one threshold value of the series defining a decrease in grey level value of the rendered pixel for meeting a respective comparison criterion, and wherein at least one threshold value of a series defining a decrease in grey level value is rendered at the background density.

14. The method according to claim 13 and including forming halftone dots of plural rendered pixels.

15. The method according to claim 14 and including:

forming halftone dots each of plural rendered pixels wherein at least some halftone dots are of a first density D1 and other halftone dots are of a second density D2 and wherein D2>D1, a halftone dot of density D1 having a rendered pixel at a respective pixel location with an assigned density d1 and a halftone dot of density D2 having a rendered pixel at the same respective pixel location with an assigned density d2 and wherein d2<d1.

16. The method according to claim 15 wherein a difference in absorptance between first and second pixels of first and second respectively adjacent levels of density is different than a difference in absorptance between the second pixel and a third pixel of second and third respectively adjacent levels of density.

17. The method according to claim 13 and including:

forming halftone dots each of plural rendered pixels wherein at least some halftone dots are of a first density D1 and other halftone dots are of a second density D2 and wherein D2>D1, a halftone dot of density D1 having a rendered pixel at a respective pixel location with an assigned density d1 and a halftone dot of density D2 having a rendered pixel at the same respective pixel location with an assigned density d2 and wherein d2<d1.

18. The method according to claim 14 and including the step of printing the rendered image data.

19. The method according to claim 14 and including the step of displaying the rendered image data as a halftone image.

20. The method of claim 13 and including determining a grey level for a rendered pixel by processing the unrendered pixel value through a series of threshold comparison steps and accumulating an index value in accordance with steps passed.

21. An apparatus for generating rendered image data for use in reproducing an image with a series of patterns of halftone dots, each halftone dot being comprised of plural pixels arranged in a halftone cell, the image being derived from unrendered image data represented by pixels each having an unrendered pixel value density assignment, the apparatus comprising:

means for comparing an unrendered pixel value of a pixel to be rendered with each of a series of threshold values in accordance with respective comparison criteria; and means for generating a grey level for a rendered pixel of a halftone dot by having certain threshold values define increasing grey level values of the rendered pixel upon meeting respective comparison criteria and at least one threshold value of the series defining a decrease in grey level value of the rendered pixel for meeting a respective comparison criterion and providing for rendering the pixel value at a background level.

* * * * *